(12) United States Patent
Ni et al.

(10) Patent No.: US 8,958,843 B2
(45) Date of Patent: Feb. 17, 2015

(54) METHOD AND DEVICE FOR MANAGING ADJACENT RELATION AMONG CELLS

(75) Inventors: Hua Ni, Shenzhen (CN); Yanqin Gao, Shenzhen (CN)

(73) Assignee: ZTE Corporation (CN)

( * ) Notice: Subject to any disclaimer, the term of this patent is extended or adjusted under 35 U.S.C. 154(b) by 46 days.

(21) Appl. No.: 13/814,815

(22) PCT Filed: May 3, 2011

(86) PCT No.: PCT/CN2011/073601
§ 371 (c)(1),
(2), (4) Date: Feb. 7, 2013

(87) PCT Pub. No.: WO2012/019468
PCT Pub. Date: Feb. 16, 2012

(65) Prior Publication Data
US 2013/0143558 A1    Jun. 6, 2013

(30) Foreign Application Priority Data
Aug. 13, 2010  (CN) .......................... 2010 1 0255795

(51) Int. Cl.
| H04B 7/00 | (2006.01) |
| H04W 24/00 | (2009.01) |
| H04W 24/02 | (2009.01) |
| H04L 12/24 | (2006.01) |
| H04W 24/04 | (2009.01) |

(52) U.S. Cl.
CPC .......... *H04W 24/00* (2013.01); *H04L 41/0663* (2013.01); *H04W 24/02* (2013.01); *H04W 24/04* (2013.01); *H04L 41/044* (2013.01)
USPC ........... 455/524; 455/560; 455/418; 455/424; 455/466; 455/422.1

(58) Field of Classification Search
CPC .... H04W 24/02; H04W 24/04; H04L 41/044; H04L 41/0663
USPC .............. 455/524, 560, 418, 422.1, 424, 446; 370/254, 255; 709/223
See application file for complete search history.

(56) References Cited

U.S. PATENT DOCUMENTS
| 8,165,590 | B2 * | 4/2012 | Gunnarsson et al. | 455/446 |
| 2007/0097938 | A1 * | 5/2007 | Nylander et al. | 370/338 |
| 2009/0047968 | A1 * | 2/2009 | Gunnarsson et al. | 455/446 |
| 2010/0015977 | A1 * | 1/2010 | Francalanci et al. | 455/435.1 |
| 2010/0046470 | A1 * | 2/2010 | Sekiya | 370/331 |

FOREIGN PATENT DOCUMENTS
| CN | 101321357 | 12/2008 |
| CN | 101478739 | 7/2009 |
| CN | 101489301 | 7/2009 |

OTHER PUBLICATIONS
International Search Report for International Patent Application No. PCT/CN2011/073601 mailed Aug. 11, 2011.

* cited by examiner

*Primary Examiner* — Khai M Nguyen
(74) *Attorney, Agent, or Firm* — McAndrews, Held & Malloy, Ltd.

(57) ABSTRACT

A method for managing adjacent relation among cells is disclosed in the disclosure. The method includes: obtaining adjacent cell configuration information of a current cell in real time; a Network Management System (NMS), an Element Management System (EMS) and a Network Element (NE), in turn, analyzing and processing the adjacent cell configuration information and adjusting an adjacent relation list of the cell, according to a hierarchical control strategy table preconfigured or in default configuration, wherein the hierarchical control strategy table is used to specify adjacent relation list configuration ability of the NMS, the EMS and the NE. A device for managing adjacent relation among cells is also disclosed in the disclosure, the adjacent cell configuration information of the cell can be detected and obtained automatically, automatic management of the adjacent relation for an area managed by the NE, the adjacent relation for an area managed by the EMS, and the adjacent relation for the crossing EMS area is implemented, and the hierarchical processing method is adopted, thus the costs of information interaction and transmission are least, the processing bottleneck can be effectively avoided, the processing capability of the whole network can be adequately discovered especially when the payload of the network is rather heavy, the processing efficiency is also improved, and the real-time performance is best.

20 Claims, 4 Drawing Sheets

---

The adjacent cell configuration information of the current cell is obtained in real time  —101 the NMS, EMS and NE, in turn, analyze and process the adjacent cell configuration information, and adjust the adjacent relation list of the cell, according to a hierarchical control strategy table preconfigured or in default configuration, wherein the hierarchical control strategy table is used to specify the adjacent relation list configuration ability of the NMS, the EMS and the NE  —102

METHOD AND DEVICE FOR MANAGING ADJACENT RELATION AMONG CELLS

FIELD OF THE INVENTION

The disclosure relates to an adjacent relation management technology of the mobile communication system, and in particular relates to a method and device for managing adjacent relation among cells.

BACKGROUND OF THE INVENTION

Generally, each Network Element (abbreviated as NE) apparatus is managed hierarchically in the mobile communication network. More specifically, the mobile communication network includes management systems of different levels such as Network Management System (abbreviated as NMS) and Element Management System (abbreviated as EMS), wherein the EMS mainly implements the function of the Element Management Layer (abbreviated as EML) and manages one or more NEs of different network types and from the same apparatus supplier. The NMS mainly implements the function of the Network Management Layer (abbreviated as NML) and is responsible for managing all NEs in the managed network. During practical applications, the NMS communicates with the EMS via a northbound interface (abbreviated as Itf-N) between the NMS and the EMS to manage apparatuses from different manufacturers and their related functions.

In the mobile communication network, the most intuitive service object supplier for users is the User Equipment (abbreviated as UE) which interacts with an NE directly and provides various services including calls and data processing etc. for the users. Generally, each NE manages a plurality of cells and each cell provides services for the UE. The coverage area of each cell is limited and the work of the UE is closely dependent on the cell where the UE is located. Normally, the UE needs to select a switching time and a switching target cell according to the configuration of the adjacent cell of the current serving cell during the moving process, wherein the switching target cell and the current serving cell may be managed by the same NE or different NEs, or may even be managed by different mobile communication systems. If the configuration of the adjacent cell of each cell in the mobile communication system is inappropriate, missing or even wrong, the quality of service of the UE may be reduced or even the service may be interrupted. Therefore, the configuration and optimization of the adjacent cell are very important for the maintenance of the network.

Currently, in the Universal Mobile Telecommunications System (abbreviated as UMTS) Terrestrial Radio Access Network (abbreviated as UTRAN), when the network is constructed initially, the cell and its adjacent cell list are configured on the EMS in manual configuration manner according to planning situation, and the configuration of the cell and the adjacent cell list is sent downwardly to the NE. During the operation process of the network, network operation data is acquired and analyzed regularly. The adjacent cell configuration of the cell is adjusted manually at the EMS layer. The NE is notified to update the adjacent cell configuration of the cells managed by the NE. In addition, during the maintenance process, managers judge whether the configuration of the adjacent cell is correct according to switching-related indexes combined with data configuration condition.

According to the solution mentioned above for configuring the adjacent cell list, the NE does not have the ability of managing the adjacent relation of its cells and is unable to update or generate a currently-appropriate adjacent cell list in real time according to the configuration information of the current cell, thus failing to ensure the accuracy of the adjacent cell list. In addition, both the adjacent relation management among the NEs and the adjacent relation management among the EMSs need to be realized by the negotiation among the NEs or the EMSs, which will greatly increase the number of the links and interaction messages, thus increase the communication load of the mobile communication system. In addition, the configuration method above only can perform manual analysis and comparison to obtain an optimization adjustment result after acquiring the performance measurement data and configuration data of the whole network, which consumes a long time and fails to update and adjust the adjacent relation in time according to the change of the cell configuration information.

SUMMARY OF THE INVENTION

In the view of this, the one purpose of the disclosure is to provide a method and device for managing adjacent relation among cells to realize automatic management of adjacent relation among cells in the mobile communication system.

To realize the purpose above, the technical solution of the disclosure is implemented as follows:

a method for managing adjacent relation among cells, the method comprises: obtaining adjacent cell configuration information of a current cell in real time; a Network Management System (NMS), an Element Management System (EMS) and a Network Element (NE), in turn, analyzing and processing the adjacent cell configuration information and adjusting an adjacent relation list of the cell, according to a hierarchical control strategy table preconfigured or in default, wherein the hierarchical control strategy table is used to specify adjacent relation list configuration ability of the NMS, the EMS and the NE.

Obtaining the adjacent cell configuration information of the current cell comprises: the NE detecting and obtaining the adjacent cell configuration information of the current cell via one or more UEs in an area managed by the NE itself.

The NMS, the EMS and the NE analyzing and processing the adjacent cell configuration information obtained and adjusting the adjacent relation list of the cell comprise: the NE, the EMS and the NMS, in turn, analyzing and processing the adjacent cell configuration information, and adjusting the adjacent relation list of the cell according to the hierarchical control strategy table and preconfigured adjacent relation management parameters in the case that the adjacent relation management parameters for indicating an adjacent relation configuration management condition are configured; the NE, the EMS and the NMS, in turn, analyzing and processing the adjacent cell configuration information, and adjusting the adjacent relation list of the cell according to the hierarchical control strategy table in the case that the adjacent relation management parameters are not configured.

In the solution above, the hierarchical control strategy table comprises an adjacent relation list configuration strategy for an area managed by the NE, an adjacent relation list configuration strategy for an area managed by the EMS and an adjacent relation list configuration strategy for a crossing EMS area (i.e., a crossing EMS area refers to an area managed by an adjacent EMS), which are respectively used to specify the adjacent relation list configuration ability of the NMS, the EMS and the NE in the area managed by the NE, in the area managed by the EMS and in the crossing EMS area;

In the solution above, the NMS, the EMS and the NE analyzing and processing the adjacent cell configuration information obtained, and adjusting the adjacent relation list of the cell comprises: in the case that the adjacent relation management parameters are configured, the NE, the EMS and the NMS, in turn, analyzing and processing the adjacent cell configuration information according to the adjacent relation management parameters and a hierarchical control strategy configured to themselves so as to determine an adjacent cell of the cell in the area managed by the NE, and/or an adjacent cell of the cell in the area managed by the EMS, and/or an adjacent cell of the cell in the crossing EMS area (i.e., a crossing EMS area refers to an area managed by an EMS adjacent to the EMS which the cell belongs to), and adjusting adjacent information of the cell in the area managed by the NE, and/or adjacent information of the cell in the area managed by the EMS, and/or adjacent information of the cell in the crossing EMS area, in the adjacent relation list respectively stored by themselves; in the case that the adjacent relation management parameters are not configured, the NE, the EMS and the NMS, in turn, analyzing and processing the adjacent cell configuration information according to a hierarchical control strategy configured to themselves so as to determine an adjacent cell of the cell in the area managed by the NE, and/or an adjacent cell of the cell in the area managed by the EMS, and/or an adjacent cell of the cell in the crossing EMS area, and adjusting adjacent information of the cell in the area managed by the NE, and/or adjacent information of the cell in the area managed by the EMS, and/or adjacent information of the cell in the crossing EMS area, in the adjacent relation list respectively stored by themselves.

In the solution above, after the NMS completes adjustment of the adjacent relation list, the method further comprises: sending downwardly, by the NMS, adjusted adjacent relation list obtained through the adjustment by the NMS itself to the EMS; sending downwardly by the EMS the adjusted adjacent relation list, which is sent downwardly by the NMS, to the NE to require configuration to be effective; uploading, by the NE, a finally-effective adjacent relation list to the EMS after the NE receives the adjusted adjacent relation list; uploading, by the EMS, the finally-effective adjacent relation list to the NMS.

In the solution above, the hierarchical control strategy table is preconfigured to the NMS, and/or the EMS, and/or the NE by a static configuration manner.

In the solution above, the adjacent relation management parameters are preconfigured to the NMS, and/or the EMS, and/or the NE by a static configuration manner.

The disclosure further provides a device for managing adjacent relation among cells, comprising: an obtaining unit and one or more adjusting units, wherein the obtaining unit is configured to obtain adjacent cell configuration information of a current cell in real time; the one or more adjusting units are configured to analyze and process the adjacent cell configuration information obtained by the obtaining unit and adjust an adjacent relation list of the cell, according to a hierarchical control strategy table preconfigured or in default, wherein the hierarchical control strategy table is used to specify adjacent relation list configuration ability of an NMS, EMS and NE.

In the solution above, the obtaining unit is deployed on the NE.

In the solution above, the one or more adjusting units are respectively deployed on the NMS, and/or the EMS, and/or the NE according to a hierarchical control strategy preconfigured.

In the solution above, the one or more adjusting units are further configured to analyze and process the adjacent cell configuration information, and adjust the adjacent relation list of the cell according to the hierarchical control strategy table and preconfigured adjacent relation management parameters in the case that the adjacent relation management parameters for indicating an adjacent relation configuration management condition are configured; analyze and process the adjacent cell configuration information and adjust the adjacent relation list of the cell according to the hierarchical control strategy table in the case that the adjacent relation management parameters are not configured.

In the solution above, part of the one or more adjusting units, deployed on the NMS, is or are further configured to after completing adjustment of the adjacent relation list, send downwardly adjusted adjacent relation list obtained through the adjustment by itself to the EMS to make the EMS further send downwardly the adjusted adjacent relation list to the NE to require configuration to be effective; part of the one or more adjusting units, deployed on the NE, is or are further configured to receive the adjusted adjacent relation list sent downwardly by the adjusting unit on the NMS and upload a finally-effective adjacent relation list to the EMS to make the EMS upload the finally-effective adjacent relation list to the NMS.

The method for managing adjacent relation among cells according to the disclosure obtains the adjacent cell configuration information of a cell in real time; then according to the preconfigured hierarchical control strategy table, the NMS, the EMS and the NE analyze and process the obtained adjacent cell configuration information, and adjust the adjacent relation list of the cell, thus the adjacent cell configuration information of the cell can be detected and obtained automatically, automatic management of the adjacent relation for an area managed by the NE, the adjacent relation for an area managed by the EMS, and the adjacent relation for the crossing EMS area are implemented, and the hierarchical processing method is adopted so that the cost of information interaction and transmission are the least, the processing bottleneck can be effectively avoided. Specially, the processing capability of the whole network can be adequately discovered when the payload of the network is rather heavy, the processing efficiency is also improved, and the real-time performance is the best.

DETAILED DESCRIPTION OF THE EMBODIMENTS

The basic idea of the disclosure is that, in the UTRAN network, automatic management of the adjacent relation of cells in the mobile communication system is implemented by the cooperation of three layers consisting of the NMS, the EMS and the NE.

Figure 1:
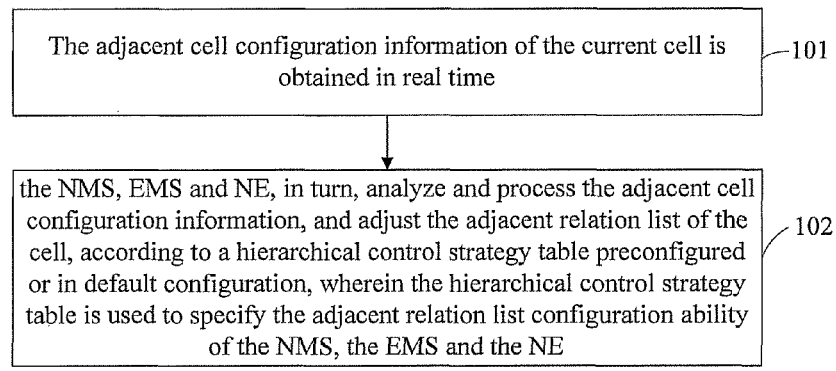
FIG. 1 is an implementation flowchart of a method for managing adjacent relation among cells of the disclosure.

A method for managing adjacent relation among cells of the disclosure can be applied to the UTRAN network, and as shown in FIG. 1, mainly includes the following steps:

Step 101: the adjacent cell configuration information of the current cell is obtained in real time.

The obtaining process can be implemented by the NE or by setting an apparatus for obtaining the adjacent cell configuration information in the NE.

The obtained adjacent cell configuration information can include information which is able to identify the adjacent cell uniquely, such as the ID of the adjacent cell, the identifier of the NE to which the adjacent cell belongs, and the network type, or, can include location information which is able to locate the adjacent cell.

In the above, the NE can obtain the adjacent cell configuration information of the cell via the UE in the cell which belongs to the NE. Specifically, the specific acquisition method is determined by the NE. The NE detects in real time whether there are UEs which are able to satisfy the preset detection condition in the area managed by the NE itself, and if so, sends downwardly measurement task to one or more of the UEs which satisfy the detection condition to request the UE/UEs to detect the adjacent cell configuration information of specified cell, and after detecting adjacent cell configuration information of the cell, the UE/UEs reports/report the detected adjacent cell configuration information to the NE; otherwise, the NE does not send downwardly the measurement task. In the above, the adjacent cell of the specified cell can include the adjacent cell in the current area managed by the NE, the adjacent cell in the current area managed by the EMS and the adjacent cell in the crossing EMS area.

In the above, the preset detection condition can be a preset detection threshold. If the current traffic of the UE is lower than the preset detection threshold, then the UE satisfies the detection condition. Otherwise, the UE fails to satisfy the detection condition, wherein an upper limit value can be preset for the number of the selected UE, and when the NE selects the UEs to implement the measurement, the number of the selected UEs can be not greater than the upper limit value.

Step 102: the NMS, EMS and NE, in turn, analyze and process the adjacent cell configuration information, and adjust the adjacent relation table of the cell, according to a hierarchical control strategy table preconfigured or in default configuration, wherein the hierarchical control strategy table is used to specify the adjacent relation list configuration ability of the NMS, the EMS and the NE.

Herein, the hierarchical control strategy table is used to specify the adjacent relation list configuration ability of the NMS, the EMS and the NE, and comprises an adjacent relation list configuration strategy for an area managed by the NE, an adjacent relation list configuration strategy for an area managed by the EMS and an adjacent relation list configuration strategy for a crossing EMS area, which are respectively used to specify the adjacent relation list configuration ability of the NMS, the EMS and the NE in the area managed by the NE, in the area managed by the EMS and in the crossing EMS area.

Generally, the adjacent relation list configuration ability which the NMS, EMS and NE are able to support is as shown in the following Table 1. During practical applications, the hierarchical control strategy table also can follow the default configuration.

TABLE 1

| | NE | EMS | NMS |
|---|---|---|---|
| adjacent relation list configuration strategy for the area managed by the NE | Support | Support | Support |
| adjacent relation list configuration strategy for the area managed by the EMS | Not support | Support | Support |
| adjacent relation list configuration strategy for the crossing EMS area | Not support | Not support | Support |

In the above, the hierarchical control strategy can be configured to the NMS and/or the EMS by a static configuration manner, and sent downwardly to the NE by the EMS and respectively stored on the NMS, the EMS and the NE. If the hierarchical control strategy is configured to the NMS, and is sent downwardly to the EMS by the NMS, and then is sent downwardly to the NE by the EMS, and respectively stored on the NMS, the EMS and the NE. If the hierarchical control strategy is configured to the EMS, the hierarchical control strategy is upwardly reported to the NMS by the EMS, and is sent downwardly to the NE, and is respectively stored on the NMS, the EMS and the NE. If the hierarchical control strategy is configured and stored on the NMS and the EMS at the same time, the hierarchical control strategy can be sent downwardly to the NE by the EMS, and then stored on the NE.

Herein, the hierarchical control strategies stored on the NMS, the EMS and the NE can be different, e.g. according to the management range of the NMS, EMS and NE for the mobile communication system, the NMS stores the adjacent relation list configuration strategy for the area managed by the NE, the adjacent relation list configuration strategy for the area managed by the EMS and the adjacent relation list configuration strategy for the crossing EMS area, and the EMS stores the adjacent relation list configuration strategy for the area managed by the NE and the adjacent relation list configuration strategy for the area managed by the EMS, and the NE only stores the adjacent relation list configuration strategy for the area managed by the NE.

In the above, the change of the hierarchical control strategy can be implemented by a static configuration manner, or can be modified in real time according to the information reported by the NE or the EMS.

The process of modifying the hierarchical control strategies is described as follows: if the adjacent relation list configuration ability supported by the NE currently is changed, e.g. the NE is changed from the originally supportive NE to the non-supportive NE, or the NE is changed from the originally non-supportive NE to the supportive NE, firstly the NE updates the hierarchical control strategy stored by the NE itself and reports the updated hierarchical control strategy to the EMS, or only reports its change information to the EMS. The EMS updates the hierarchical control strategy stored by the EMS itself according to the hierarchical control strategy or the change information reported by the NE, i.e. the EMS changes the strategy of the NE in the hierarchical control strategy stored by the EMS itself (e.g. a corresponding supportive NE is changed into a non-supportive NE, or a non-supportive NE is changed into a supportive NE), in addition, the EMS reports the obtained updated hierarchical control strategy or the change information of the NE to the NMS, and the NMS updates the hierarchical control strategy stored by the NMS itself according to the hierarchical control strategy or the change information of the NE reported by the EMS. The specific updating process is similar to the process for updating the hierarchical control strategy by the EMS.

If adjacent relation management parameters are configured, then the step of analyzing and processing the adjacent cell configuration information and adjusting the adjacent relation list of the cell in Step 102 can include: after the NE obtains the adjacent cell configuration information, the NE, EMS and NMS in turn analyze and process the adjacent cell configuration information and adjust the adjacent relation list of the cell according to the hierarchical control strategy table and the preconfigured adjacent relation management parameters.

Herein, the adjacent relation management parameters are configured to indicate the management condition of the adjacent relation configuration, wherein the adjacent relation management parameters can include a parameter configured to indicate specified cells which are prohibited from being switched to, and/or a parameter configured to indicate that a specified adjacent relation cannot be deleted, etc. Herein, the configuration of the adjacent relation management parameters is optional, and it can be determined whether the configuration is performed according to the needs of practical applications.

For example, the configured adjacent relation management parameters can include a list of specified cells which are prohibited from being switched to, a list of specified adjacent relations which are not allowed to be deleted, a condition threshold for adding adjacent information and a condition threshold for deleting adjacent information, wherein the list of specified cells which are prohibited from being switched to can include related information of specified cells which are prohibited from being switched to, and the list of specified adjacent relations which are not allowed to be deleted can include specified adjacent information which are prohibited from being deleted so as to prevent reasonably-planned adjacent information from being deleted by a mistake when there is no service temporarily.

Different condition thresholds for adding adjacent information can be set for the NE and the EMS, e.g. the condition threshold for adding adjacent information can be whether the times of detecting and reporting a certain cell by the UE in a certain period exceed a specific frequency.

Different condition thresholds for deleting adjacent relation can be set for the NE and the EMS. For example, the condition threshold for deleting adjacent relation on the NE can be that the times of detecting and reporting the adjacent cell of a certain cell by the UE in a certain period is lower than 5, the condition threshold for deleting adjacent relation on the EMS can be that the times of switching a certain adjacent relation in a certain period is lower than a preset threshold.

In the above, the manner for configuring the adjacent relation management parameters is the same as the manner for configuring the hierarchical control strategy table. Herein, the adjacent relation management parameters can be configured to the NMS or EMS by a static configuration manner, then be sent downwardly to the NE by the EMS and be respectively stored on the NMS, EMS, and NE.

Herein, the adjacent relation management parameters stored by each layer can be added or reduced according to the stored hierarchical control strategy of the layer, e.g. for the NE, if the NE can only support the configuration of the adjacent relation list of the area managed by the NE, the NE only needs to store the hierarchical control strategy for the area managed by the NE and the adjacent relation management parameters related to the area managed by the NE.

The step of analyzing and processing the adjacent cell configuration information, and adjusting the adjacent relation list of the cell by the NE, EMS, NMS in turn includes:

if the adjacent relation management parameters are configured, the NE, the EMS and the NMS, in turn, analyze and process the adjacent cell configuration information according to the adjacent relation management parameters and the hierarchical control strategy configured to themselves, so as to determine an adjacent cell of the cell in the area managed by the NE, and/or an adjacent cell of the cell in the area managed by the EMS, and/or an adjacent cell of the cell in the crossing EMS area, and adjust adjacent information of the cell in the area managed by the NE, and/or adjacent information of the cell in the area managed by the EMS, and/or adjacent information of the cell in the crossing EMS area, in the adjacent relation list respectively stored by themselves.

if the adjacent relation management parameters are not configured, the NE, the EMS and the NMS, in turn, analyze and process the adjacent cell configuration information according to a hierarchical control strategy configured to themselves, so as to determine an adjacent cell of the cell in the area managed by the NE, and/or an adjacent cell of the cell in the area managed by the EMS, and/or an adjacent cell of the cell in the in the crossing EMS area, and adjust adjacent information of the cell in the area managed by the NE, and/or adjacent information of the cell in the area managed by the EMS, and/or adjacent information of the cell in the crossing EMS area, in the adjacent relation list respectively stored by themselves.

Herein, the method for determining by the NE the adjacent cell of the cell in the area managed by the NE according to the adjacent cell configuration information obtained by the NE can be implemented according to the frequency statistics of detecting and reporting the cell by multiple UEs or be implemented by analyzing the measurement report from the UE. The specific method can be implemented through related technologies, which will not be redundantly repeated herein. The adjacent cell of the area managed by the NE, the adjacent cell of the area managed by the EMS and the adjacent cell of the crossing EMS area can also be determined by the EMS and the NMS through related technologies.

Herein, the step of adjusting the adjacent information of the cell in the area managed by the NE, and/or adjacent information of the cell in the area managed by the EMS, and/or adjacent information of the cell in the crossing EMS area in the adjacent relation list can be performed according to the following steps: detecting whether the adjacent information between the cell and the determined adjacent cell in the area managed by the NE, and/or in the area managed by the EMS and/or in the crossing EMS area has been configured in the adjacent relation list of the cell; if so, not needing to adjust the adjacent relation list of the NE; otherwise, adding, deleting or modifying the adjacent information, between the cell and the determined adjacent cell in the area managed by the NE, and/or in the area managed by the EMS and/or in the crossing EMS area, in the adjacent relation list of the cell.

Herein, if the adjacent relation management parameters are preconfigured, then the step of adding, deleting or modifying the adjacent information between the cell and the determined adjacent cell in the area managed by the NE can further specifically include: determining whether the adjacent information to be adjusted satisfies the requirements of the preconfigured adjacent relation management parameters; if so, adding, deleting or modifying the adjacent information in the adjacent relation list, otherwise, not adding, deleting or modifying the adjacent information.

Herein, if the adjacent relation list of the cell is fully configured, when the adjacent information is newly added, according to the preset adjacent information adjusting algorithm in combination with the preconfigured adjacent relation management parameters, deleting parts of the adjacent information in the adjacent relation list, and then adding the adjacent information to be newly added into the adjacent relation list, wherein the adjacent information adjusting algorithm can be determined by the NE or the EMS or the NMS.

In the above, during the process of adjusting the adjacent relation list by the EMS, the log of the adjacent relation process is recorded at the same time to facilitate the enquiry.

Herein, if the adjacent relation adjustment of an upper level conflicts with the adjustment of the lower level, the updated adjacent relation list which is obtained finally is adopted on the premise of satisfying the adjacent relation management parameters.

After the NMS completes the adjustment of the adjacent relation list, the method further includes: sending downwardly, by the NMS, adjusted adjacent relation list obtained through the adjustment by the NMS itself to the EMS; sending downwardly by the EMS the adjusted adjacent relation list, which is sent downwardly by the NMS, to the NE to require configuration to be effective; uploading, by the NE, a finally-effective adjacent relation list to the EMS after the NE receives the adjusted adjacent relation list; uploading, by the EMS, the finally-effective adjacent relation list to the NMS.

Thus, according to above method, the automatic discovery and adjustment of the adjacent relations among all cells in the whole mobile network can be implemented by the cooperation of the NE, the EMS and the NMS.

To achieve the method above, the disclosure further provides an device for managing adjacent relation among cells, the device includes: an obtaining unit and one or more adjusting units, wherein the obtaining unit is configured to obtain the adjacent cell configuration information of a current cell in real time; the one or more adjusting unit are configured to analyze and process the adjacent cell configuration information obtained by the obtaining unit and adjust an adjacent relation list of the cell, according to a hierarchical control strategy table preconfigured or in default configuration, wherein the hierarchical control strategy table is used to specify adjacent relation list configuration ability of an NMS, EMS and NE.

In the above, the obtaining unit is deployed on the NE and the one or more adjusting unit are respectively deployed on the NMS, the EMS and the NE.

The one or more adjusting units can be respectively deployed on the NMS, the EMS, and the NE according to the p reconfigured hierarchical control strategy. During practical applications, the adjusting unit can be configured to analyze and process the adjacent cell configuration information, and adjust the adjacent relation list of the cell according to the hierarchical control strategy table and preconfigured adjacent relation management parameters in the case that the adjacent relation management parameters are configured; analyze and process the adjacent cell configuration information and adjust the adjacent relation list of the cell according to the hierarchical control strategy table in the case that the adjacent relation management parameters are not configured.

In the above, the adjusting unit deployed on the NMS is further configured to after completing adjustment of the adjacent relation list, send downwardly adjusted adjacent relation list obtained through the adjustment by itself to the EMS to make the EMS further send downwardly the adjusted adjacent relation list to the NE to require configuration to be effective; the adjusting unit deployed on the NE is further configured to receive the adjusted adjacent relation list sent downwardly by the adjusting unit on the NMS and upload a finally-effective adjacent relation list to the EMS to make the EMS upload the finally-effective adjacent relation list to the NMS.

Figure 2:
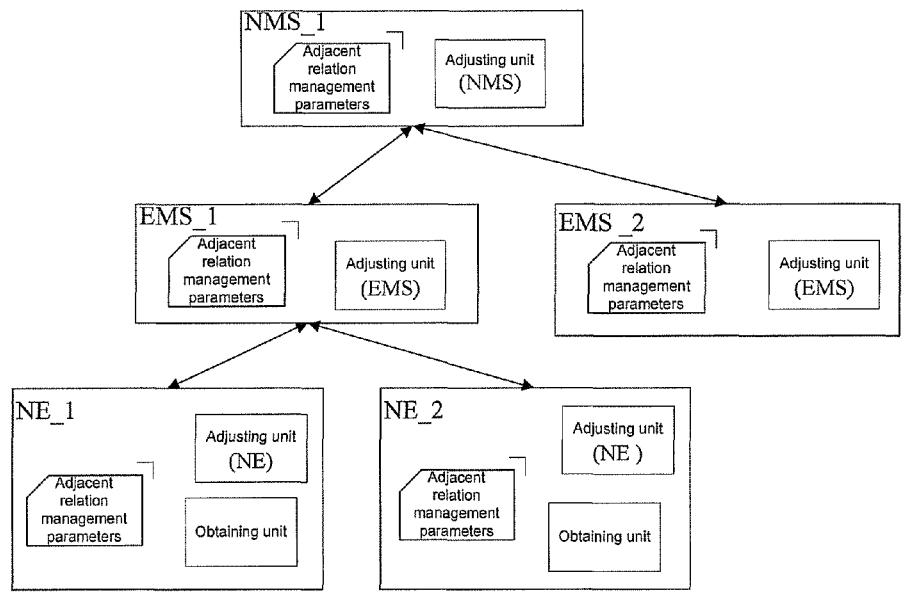
FIG. 2 is a schematic diagram of a network framework of a mobile communication network.
Figure 3:
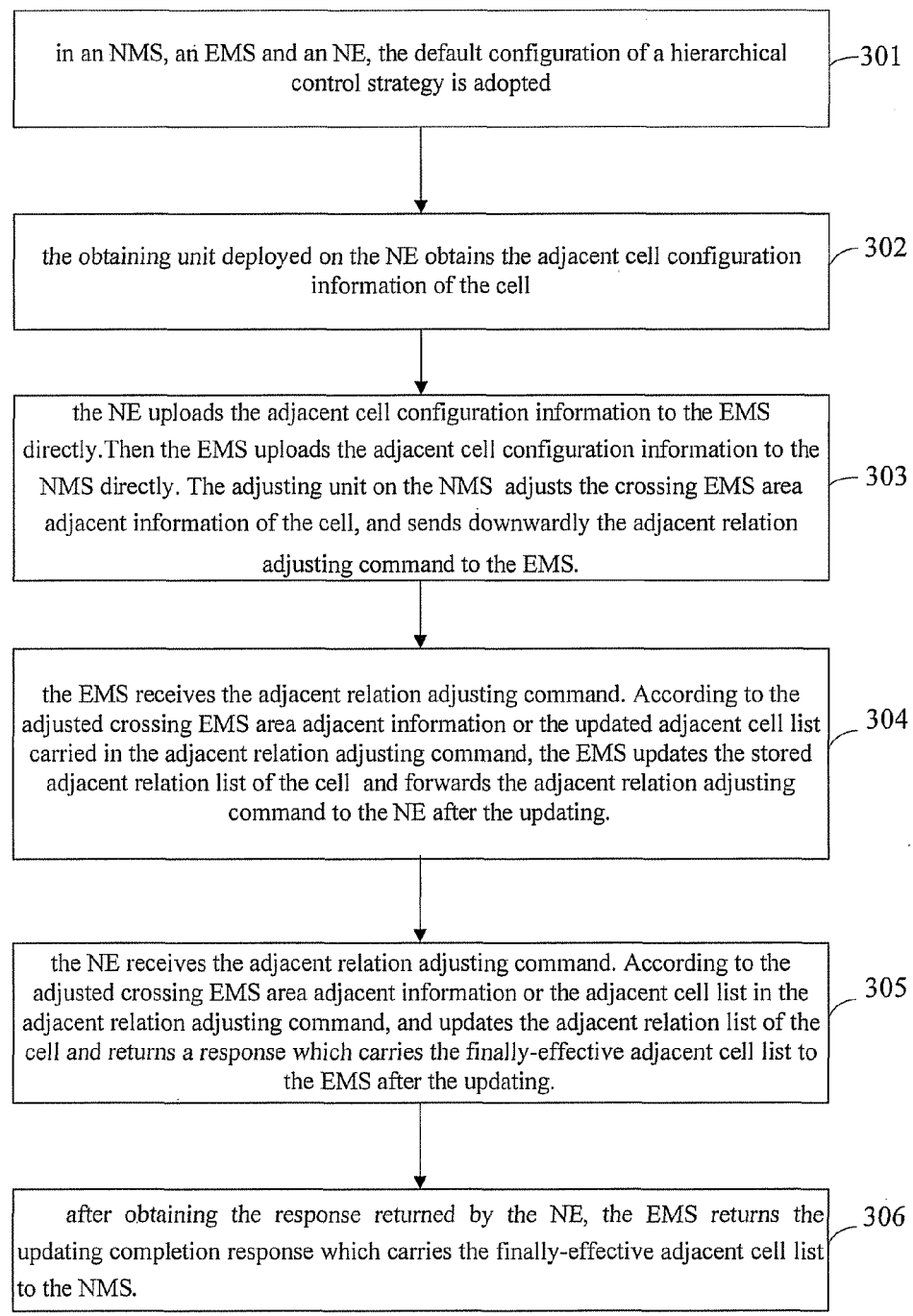
FIG. 3 is an implementation flowchart of the first embodiment of the disclosure.

For example, the mobile communication network as shown in FIG. 2 includes NMS_1, EMS_1, EMS_2, NE_1 and NE_2, wherein the NMS_1 manages the EMS_1 and the EMS_2. The EMS_1 manages the NE_1 and the NE_2. The adjusting units can be deployed on any one or more of NMS_1, EMS_1, EMS_2, NE_1 and NE_2. The obtaining unit is deployed on the NE_1 and the NE_2, wherein the adjacent relation management parameters are stored on all of the NMS_1, the EMS_1, the EMS_2, the NE_1 and the NE_2.

Embodiment 1

In the present embodiment, a process for implementing adjacent relation management among cells in the mobile communication system includes:

Step 301: in an NMS, an EMS and an NE, the default configuration of the hierarchical control strategy is adopted, which is as shown in Table 2 specifically, wherein the NE supports adjacent relation list configuration for the area managed by the NE of the cell, the EMS only supports adjacent relation list configuration for the area managed by the EMS of the cell, and the NMS only supports adjacent relation list configuration for the area managed by the EMS of the cell and adjacent relation list configuration for the crossing EMS area of the cell.

TABLE 2

|  | NE | EMS | NMS |
| --- | --- | --- | --- |
| adjacent relation list configuration strategy for the area managed by the NE | Support | Not support | Not support |
| adjacent relation list configuration strategy for the area managed by the EMS | Not support | Support | Not support |
| adjacent relation list configuration strategy for the crossing EMS area | Not support | Not support | Support |

Step 302: the obtaining unit deployed on the NE obtains the adjacent cell configuration information of the cell.

Step 303: the NE first determines that the identifier of the NE itself does not accord with an identifier of a NE, to which the adjacent cell belongs to, in the adjacent cell configuration information, then the NE uploads the adjacent cell configuration information to the EMS directly. The EMS receives the adjacent cell configuration information, and determines that the identifier of the NE, to which the adjacent cell belongs to, in the adjacent cell configuration information does not accord with the identifier of the NE which is managed by the EMS itself, and then uploads the adjacent cell configuration information to the NMS directly. The adjusting unit on the NMS analyzes and processes the adjacent cell configuration information, and adjusts the crossing EMS area adjacent information of the cell, and updates the adjacent relation list of the cell stored in the NMS, and sends downwardly the adjacent relation adjusting command, which carries the adjusted crossing EMS area adjacent information or the updated adjacent cell list, to the EMS via an interface of a Configuration Management Interface Point (CMIRP) in the itf-N.

Step 304: the EMS receives the adjacent relation adjusting command sent downwardly by the NMS. According to the adjusted crossing EMS area adjacent information or the updated adjacent cell list carried in the adjacent relation adjusting command, the adjusting unit on the EMS updates the adjacent relation list of the cell stored on the EMS and forwards the adjacent relation adjusting command to the NE after the updating.

Step 305: the NE receives the adjacent relation adjusting command. According to the adjusted crossing EMS area adjacent information or the updated adjacent cell list carried in the adjacent relation adjusting command, the adjusting unit on the NE updates the adjacent relation list of the cell stored on the NE and returns a response which carries the finally-effective adjacent cell list to the EMS after the updating.

Step 306: after receiving the response returned by the NE, the EMS obtains the finally-effective adjacent cell list and returns the updating completion response which carries the finally-effective adjacent cell list to the NMS to complete the automatic discovery and adjustment of the adjacent relation of the cell.

Embodiment 2

Figure 4:
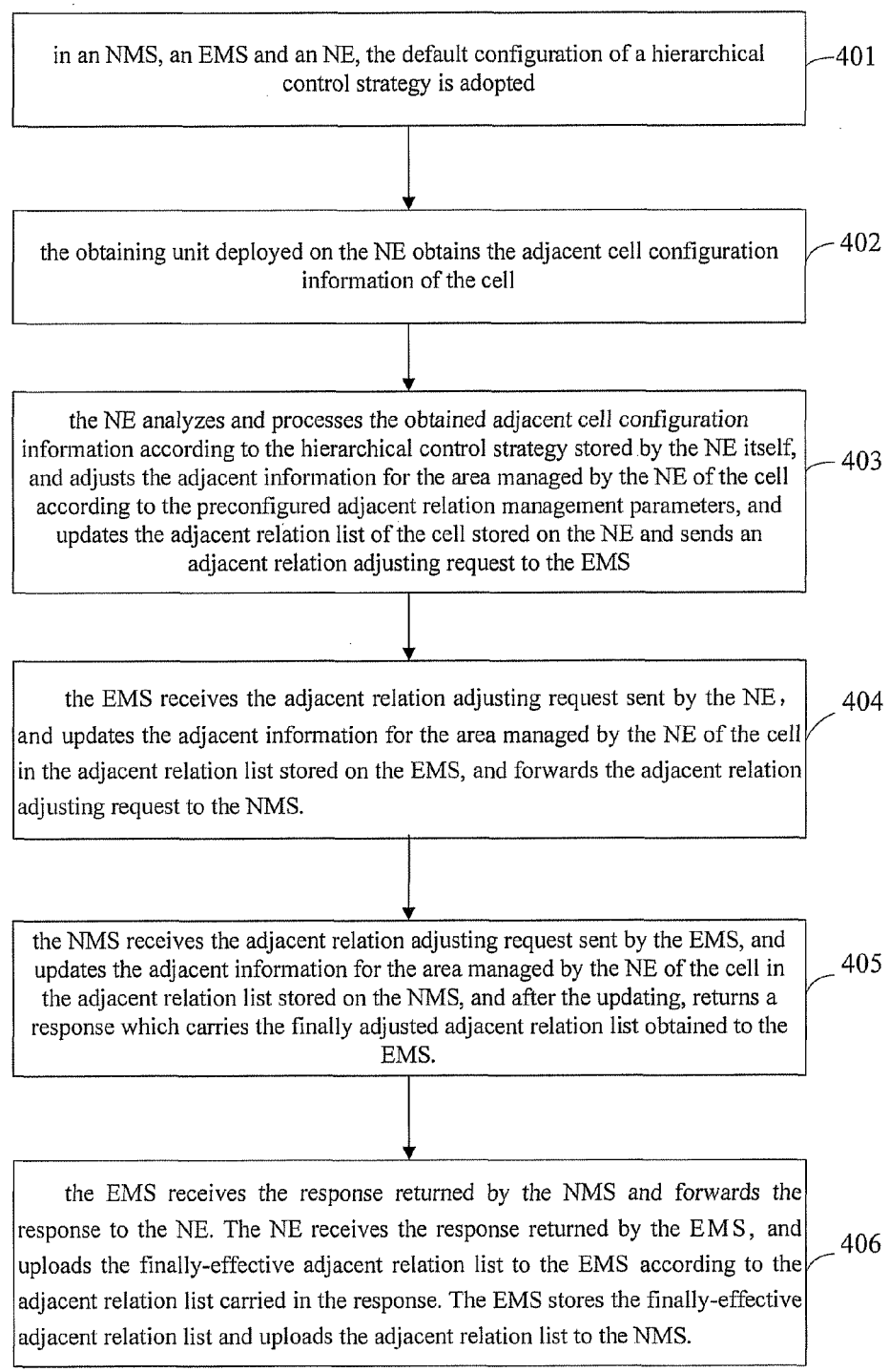
FIG. 4 is an implementation flowchart of the second embodiment of the disclosure.

In the present embodiment, a process for implementing adjacent cell relation management among cells in the mobile communication system is as shown in FIG. 4 and can include the following steps:

Step 401: the same as Step 301.

Step 402: the obtaining unit deployed on the NE obtains the adjacent cell configuration information of a cell.

Step 403: the NE determines that the identifier of a NE, to which the adjacent cell belongs, of the configuration information of each cell in the adjacent cell configuration information all accord with the identifier of the NE itself, and then according to the hierarchical control strategy stored by the NE itself, the adjusting unit on the NE analyzes and processes the obtained adjacent cell configuration information, and according to the preconfigured adjacent relation management parameters, adjusts the adjacent information for the area managed by the NE of the cell, and updates the adjacent relation list of the cell stored on the NE and sends an adjacent relation adjusting request which carries the adjusted adjacent information for the area managed by the NE or the updated adjacent relation list to the EMS.

Step 404: the EMS receives the adjacent relation adjusting request sent by the NE. The adjusting unit on the EMS updates the adjacent information for the area managed by the NE of the cell in the adjacent relation list stored on the EMS and forwards the adjacent relation adjusting request to the NMS.

Step 405: the NMS receives the adjacent relation adjusting request sent by the EMS. The adjusting unit on the NMS updates the adjacent information for the area managed by the NE of the cell in the adjacent relation list stored on the NMS, and after the updating, returns a response which carries the finally adjusted adjacent relation list obtained to the EMS.

Step 406: the EMS receives the response returned by the NMS and forwards the response to the NE. The NE receives the response returned by the EMS, performs the effective operation of the adjacent relation list according to the adjacent relation list carried in the response, and uploads the finally-effective adjacent relation list to the EMS. The EMS stores the finally-effective adjacent relation list and uploads the adjacent relation list to the NMS. Hereto, automatic discovery and adjustment of the adjacent relation of the cell are completed.

Embodiment 3

Figure 5:
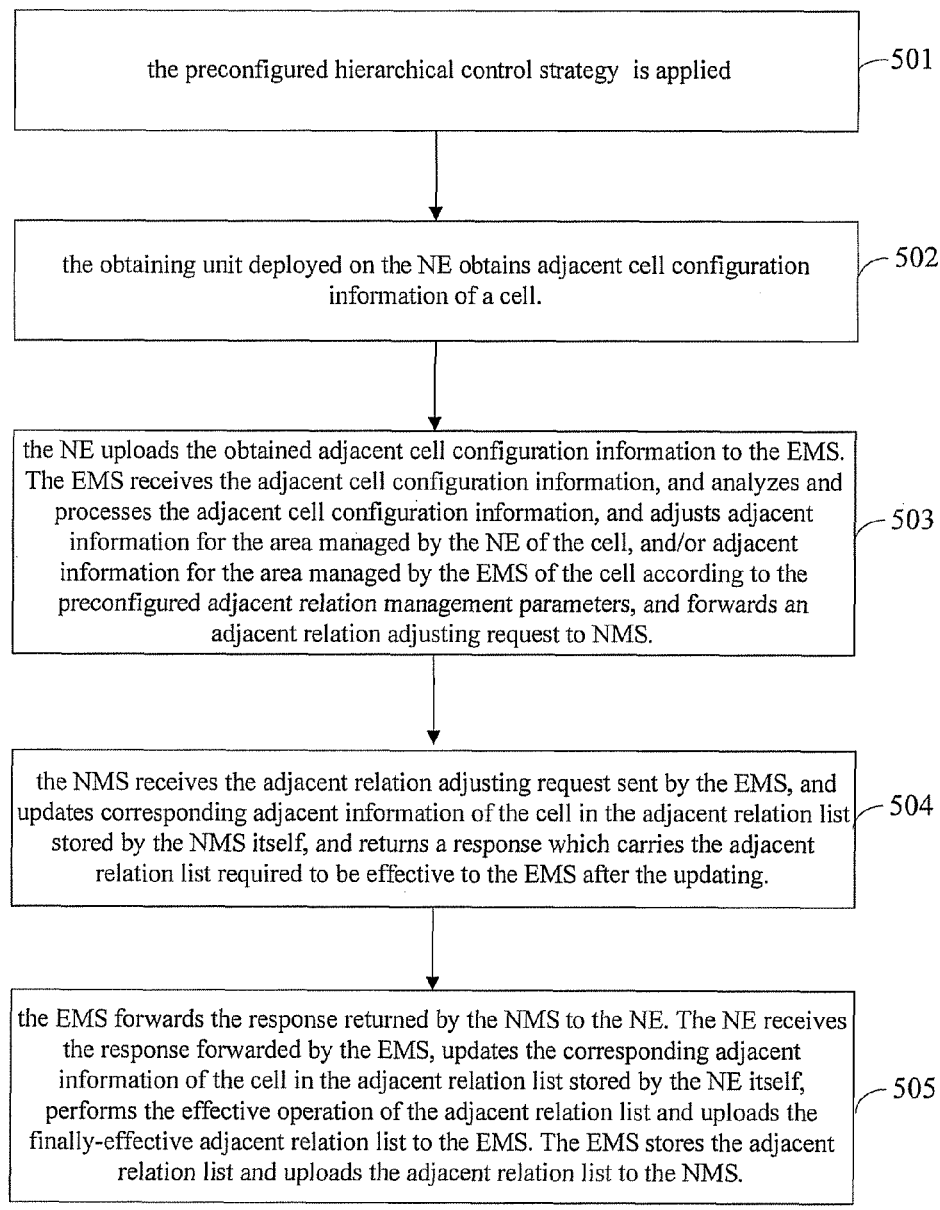
FIG. 5 is an implementation flowchart of the third embodiment of the disclosure.

In the present embodiment, a process for implementing adjacent cell relation management among cells in the mobile communication system is as shown in FIG. 5 and can specifically include the following steps:

Step 501: the preconfigured hierarchical control strategy as shown in Table 3 is applied. The NE does not support adjacent relation list configuration for the area managed by the NE, the EMS supports adjacent relation list configuration for the area managed by the NE and adjacent relation list configuration for the area managed by the EMS, and an NMS only supports adjacent relation list configuration strategy for the crossing EMS area. Generally, the hierarchical control strategy is set when the network element does not support adjacent cell management.

TABLE 3

|  | NE | EMS | NMS |
|---|---|---|---|
| adjacent relation list configuration strategy for the area managed by the NE | Not support | Support | Not support |
| adjacent relation list configuration strategy for the area managed by the EMS | Not support | Support | Not support |
| adjacent relation list configuration strategy for the crossing EMS area | Not support | Not support | Support |

Step 502: the obtaining unit deployed on the NE obtains adjacent cell configuration information of a cell.

Step 503: the NE determines that configuration of any adjacent relation list is not supported by the NE itself, uploads the obtained adjacent cell configuration information to the EMS. The EMS receives the adjacent cell configuration information, and determines that the identifier of an NE, to which each cell belongs, in the adjacent cell configuration information is the same as the identifier of the NE managed by the EMS itself, and then the adjusting unit on the EMS analyzes and processes the adjacent cell configuration information, and according to the preconfigured adjacent relation management parameters, adjusts adjacent information for the area managed by the NE of the cell, and/or adjacent information for the area managed by the EMS of the cell, and updates the adjacent relation list of the cell stored on the EMS, and forwards an adjacent relation adjusting request which carries the adjusted adjacent information or the updated adjacent relation list to the NMS.

Step 504: the NMS receives the adjacent relation adjusting request sent by the EMS, and updates corresponding adjacent information of the cell in the adjacent relation list stored by the NMS itself, and returns a response which carries the adjacent relation list required to be effective to the EMS after the updating.

Step 505: the EMS forwards the response returned by the NMS to the NE. The NE receives the response forwarded by the EMS, updates the corresponding adjacent information of the cell in the adjacent relation list stored by the NE itself, performs the effective operation of the adjacent relation list and uploads the finally-effective adjacent relation list to the EMS. The EMS stores the adjacent relation list and uploads the adjacent relation list to the NMS. Hereto, automatic discovery and adjustment of the adjacent relation of the cell are completed.

The above are only preferred embodiments of the present disclosure and should not be used to limit the present disclosure. Any modifications, equivalent replacements, improvements and the like within the spirit and principle of the present disclosure shall fall within the scope of protection of the present disclosure.

What is claimed is:

1. A method for managing adjacent relation among cells, comprising:
   obtaining adjacent cell configuration information of a current cell in real time;
   a Network Management System (NMS), an Element Management System (EMS) and a Network Element (NE), in turn, analyzing and processing the adjacent cell configuration information and adjusting an adjacent relation list of the cell, according to a hierarchical control strategy table preconfigured or in default configuration, wherein the hierarchical control strategy table is used to specify adjacent relation list configuration ability of the NMS, the EMS and the NE.

2. The method for managing adjacent relation among cells according to claim 1, wherein obtaining the adjacent cell configuration information of the current cell comprises:
   the NE detecting and obtaining the adjacent cell configuration information of the current cell via one or more UEs in an area managed by the NE itself.

3. The method for managing adjacent relation among cells according to claim 1, wherein the NMS, the EMS and the NE analyzing and processing the adjacent cell configuration information obtained and adjusting the adjacent relation list of the cell comprise:

the NE, the EMS and the NMS, in turn, analyzing and processing the adjacent cell configuration information, and adjusting the adjacent relation list of the cell according to the hierarchical control strategy table and preconfigured adjacent relation management parameters in the case that the adjacent relation management parameters for indicating an adjacent relation configuration management condition are configured;

the NE, the EMS and the NMS, in turn, analyzing and processing the adjacent cell configuration information, and adjusting the adjacent relation list of the cell according to the hierarchical control strategy table in the case that the adjacent relation management parameters are not configured.

4. The method for managing adjacent relation among cells according to claim 1, wherein the hierarchical control strategy table comprises an adjacent relation list configuration strategy for an area managed by the NE, an adjacent relation list configuration strategy for an area managed by the EMS and an adjacent relation list configuration strategy for a crossing EMS area, which are respectively used to specify the adjacent relation list configuration ability of the NMS, the EMS and the NE in the area managed by the NE, in the area managed by the EMS and in the crossing EMS area;

the NMS, the EMS and the NE analyzing and processing the adjacent cell configuration information obtained, and adjusting the adjacent relation list of the cell comprises:

in the case that the adjacent relation management parameters are configured, the NE, the EMS and the NMS, in turn, analyzing and processing the adjacent cell configuration information according to the adjacent relation management parameters and a hierarchical control strategy configured to themselves so as to determine an adjacent cell of the cell in the area managed by the NE, and/or an adjacent cell of the cell in the area managed by the EMS, and/or an adjacent cell of the cell in the crossing EMS area, and adjusting adjacent information of the cell in the area managed by the NE, and/or adjacent information of the cell in the area managed by the EMS, and/or adjacent information of the cell in the crossing EMS area, in the adjacent relation list respectively stored by themselves;

in the case that the adjacent relation management parameters are not configured, the NE, the EMS and the NMS, in turn, analyzing and processing the adjacent cell configuration information according to a hierarchical control strategy configured to themselves so as to determine an adjacent cell of the cell in the area managed by the NE, and/or an adjacent cell of the cell in the area managed by the EMS, and/or an adjacent cell of the cell in the crossing EMS area, and adjusting adjacent information of the cell in the area managed by the NE, and/or adjacent information of the cell in the area managed by the EMS, and/or adjacent information of the cell in the crossing EMS area, in the adjacent relation list respectively stored by themselves.

5. The method for managing adjacent relation among cells according to claim 4, wherein after the NMS completes adjustment of the adjacent relation list, the method further comprises:

sending downwardly, by the NMS, adjusted adjacent relation list obtained through the adjustment by the NMS itself to the EMS;

sending downwardly by the EMS the adjusted adjacent relation list, which is sent downwardly by the NMS, to the NE to require configuration to be effective;

uploading, by the NE, a finally-effective adjacent relation list to the EMS after the NE receives the adjusted adjacent relation list;

uploading, by the EMS, the finally-effective adjacent relation list to the NMS.

6. The method for managing adjacent relation among cells according to claim 4, wherein the hierarchical control strategy table is preconfigured to the NMS, and/or the EMS, and/or the NE by a static configuration manner.

7. The method for managing adjacent relation among cells according to claim 4, wherein the adjacent relation management parameters are preconfigured to the NMS, and/or the EMS, and/or the NE by a static configuration manner.

8. A device for managing adjacent relation among cells, comprising: an obtaining unit and one or more adjusting units, wherein the obtaining unit is configured to obtain adjacent cell configuration information of a current cell in real time;

the one or more adjusting units are configured to analyze and process the adjacent cell configuration information obtained by the obtaining unit and adjust an adjacent relation list of the cell, according to a hierarchical control strategy table preconfigured or in default configuration, wherein the hierarchical control strategy table is used to specify adjacent relation list configuration ability of an NMS, EMS and NE.

9. The device for managing adjacent relation among cells according to claim 8, wherein the obtaining unit is deployed on the NE.

10. The device for managing adjacent relation among cells according to claim 8, wherein the one or more adjusting units are respectively deployed on the NMS, and/or the EMS, and/or the NE according to a hierarchical control strategy preconfigured.

11. The device for managing adjacent relation among cells according to claim 8, wherein the one or more adjusting units are further configured to analyze and process the adjacent cell configuration information, and adjust the adjacent relation list of the cell according to the hierarchical control strategy table and preconfigured adjacent relation management parameters in the case that the adjacent relation management parameters for indicating an adjacent relation configuration management condition are configured;

analyze and process the adjacent cell configuration information and adjust the adjacent relation list of the cell according to the hierarchical control strategy table in the case that the adjacent relation management parameters are not configured.

12. The device for managing adjacent relation among cells according to claim 8, wherein part of the one or more adjusting units, deployed on the NMS, is or are further configured to after completing adjustment of the adjacent relation list, send downwardly adjusted adjacent relation list obtained through the adjustment by itself to the EMS to make the EMS further send downwardly the adjusted adjacent relation list to the NE to require configuration to be effective;

part of the one or more adjusting units, deployed on the NE, is or are further configured to receive the adjusted adjacent relation list sent downwardly by the adjusting unit on the NMS and upload a finally-effective adjacent relation list to the EMS to make the EMS upload the finally-effective adjacent relation list to the NMS.

13. The method for managing adjacent relation among cells according to claim 2, wherein
the hierarchical control strategy table comprises an adjacent relation list configuration strategy for an area managed by the NE, an adjacent relation list configuration strategy for an area managed by the EMS and an adjacent relation list configuration strategy for a crossing EMS area, which are respectively used to specify the adjacent relation list configuration ability of the NMS, the EMS and the NE in the area managed by the NE, in the area managed by the EMS and in the crossing EMS area;
the NMS, the EMS and the NE analyzing and processing the adjacent cell configuration information obtained, and adjusting the adjacent relation list of the cell comprises:
in the case that the adjacent relation management parameters are configured, the NE, the EMS and the NMS, in turn, analyzing and processing the adjacent cell configuration information according to the adjacent relation management parameters and a hierarchical control strategy configured to themselves so as to determine an adjacent cell of the cell in the area managed by the NE, and/or an adjacent cell of the cell in the area managed by the EMS, and/or an adjacent cell of the cell in the crossing EMS area, and adjusting adjacent information of the cell in the area managed by the NE, and/or adjacent information of the cell in the area managed by the EMS, and/or adjacent information of the cell in the crossing EMS area, in the adjacent relation list respectively stored by themselves;
in the case that the adjacent relation management parameters are not configured, the NE, the EMS and the NMS, in turn, analyzing and processing the adjacent cell configuration information according to a hierarchical control strategy configured to themselves so as to determine an adjacent cell of the cell in the area managed by the NE, and/or an adjacent cell of the cell in the area managed by the EMS, and/or an adjacent cell of the cell in the crossing EMS area, and adjusting adjacent information of the cell in the area managed by the NE, and/or adjacent information of the cell in the area managed by the EMS, and/or adjacent information of the cell in the crossing EMS area, in the adjacent relation list respectively stored by themselves.

14. The method for managing adjacent relation among cells according to claim 3, wherein
the hierarchical control strategy table comprises an adjacent relation list configuration strategy for an area managed by the NE, an adjacent relation list configuration strategy for an area managed by the EMS and an adjacent relation list configuration strategy for a crossing EMS area, which are respectively used to specify the adjacent relation list configuration ability of the NMS, the EMS and the NE in the area managed by the NE, in the area managed by the EMS and in the crossing EMS area;
the NMS, the EMS and the NE analyzing and processing the adjacent cell configuration information obtained, and adjusting the adjacent relation list of the cell comprises:
in the case that the adjacent relation management parameters are configured, the NE, the EMS and the NMS, in turn, analyzing and processing the adjacent cell configuration information according to the adjacent relation management parameters and a hierarchical control strategy configured to themselves so as to determine an adjacent cell of the cell in the area managed by the NE, and/or an adjacent cell of the cell in the area managed by the EMS, and/or an adjacent cell of the cell in the crossing EMS area, and adjusting adjacent information of the cell in the area managed by the NE, and/or adjacent information of the cell in the area managed by the EMS, and/or adjacent information of the cell in the crossing EMS area, in the adjacent relation list respectively stored by themselves;
in the case that the adjacent relation management parameters are not configured, the NE, the EMS and the NMS, in turn, analyzing and processing the adjacent cell configuration information according to a hierarchical control strategy configured to themselves so as to determine an adjacent cell of the cell in the area managed by the NE, and/or an adjacent cell of the cell in the area managed by the EMS, and/or an adjacent cell of the cell in the crossing EMS area, and adjusting adjacent information of the cell in the area managed by the NE, and/or adjacent information of the cell in the area managed by the EMS, and/or adjacent information of the cell in the crossing EMS area, in the adjacent relation list respectively stored by themselves.

15. The method for managing adjacent relation among cells according to claim 13, wherein after the NMS completes adjustment of the adjacent relation list, the method further comprises:
sending downwardly, by the NMS, adjusted adjacent relation list obtained through the adjustment by the NMS itself to the EMS;
sending downwardly by the EMS the adjusted adjacent relation list, which is sent downwardly by the NMS, to the NE to require configuration to be effective;
uploading, by the NE, a finally-effective adjacent relation list to the EMS after the NE receives the adjusted adjacent relation list;
uploading, by the EMS, the finally-effective adjacent relation list to the NMS.

16. The method for managing adjacent relation among cells according to claim 14, wherein after the NMS completes adjustment of the adjacent relation list, the method further comprises:
sending downwardly, by the NMS, adjusted adjacent relation list obtained through the adjustment by the NMS itself to the EMS;
sending downwardly by the EMS the adjusted adjacent relation list, which is sent downwardly by the NMS, to the NE to require configuration to be effective;
uploading, by the NE, a finally-effective adjacent relation list to the EMS after the NE receives the adjusted adjacent relation list;
uploading, by the EMS, the finally-effective adjacent relation list to the NMS.

17. The method for managing adjacent relation among cells according to claim 13, wherein the hierarchical control strategy table is preconfigured to the NMS, and/or the EMS, and/or the NE by a static configuration manner.

18. The method for managing adjacent relation among cells according to claim 14, wherein the hierarchical control strategy table is preconfigured to the NMS, and/or the EMS, and/or the NE by a static configuration manner.

19. The method for managing adjacent relation among cells according to claim 13, wherein the adjacent relation management parameters are preconfigured to the NMS, and/or the EMS, and/or the NE by a static configuration manner.

20. The method for managing adjacent relation among cells according to claim 14, wherein the adjacent relation management parameters are preconfigured to the NMS, and/or the EMS, and/or the NE by a static configuration manner.

* * * * *